INVENTOR:
THEODOR BRENDEL
BY
HIS ATTORNEYS

Patented Mar. 23, 1954

2,672,788

UNITED STATES PATENT OFFICE 2,672,788

PHOTOGRAPHIC OBJECTIVE COMPRISING TWO OUTER POSITIVE SINGLE ELEMENT MEMBERS ENCLOSING TWO MENISCAL SHAPED NEGATIVE MEMBERS

Theodor Brendel, Munich, Germany, assignor to Agfa Camera-Werk Aktiengesellschaft, Munich, Germany, a corporation of Germany Application July 19, 1951, Serial No. 237,567
Claims priority, application Germany
July 26, 1950

2 Claims. (Cl. 88—57)

My present invention relates to a photographic objective corrected for spherical and chromatic aberrations, coma, astigmatism, field-curvature and distortion, having a large aperture. More particularly the present invention is concerned with a lens combination comprising four members separated from each other by air spaces, which are arranged in such a manner that the two outer single elements of positive power include two menisci of negative power, having their concave surfaces facing towards the aperture stop, the meniscus in front of the aperture stop being composed of a convergent and a divergent part, whereas the meniscus behind the aperture stop is a single member.

Five-lens photographic objectives having a relative aperture of F:2.8 are already known. In such cases there were preferably employed lens systems which in their construction could be related back to the Taylor triple lens. Despite the substitution of the single elements by cemented members or closely adjoining single lenses, it has been stated that, even with a five-lens system of such construction, there still remain noticeably residual optical defects. These are primarily the residual defects for spherical aberration or astigmatism, frequently also for residual chromatism.

According to my present invention these residual defects can be kept substantially smaller in a five-lens system by selecting a lens system that represents a modification of the Gauss'-double objective and wherein the overall length of the system ranges between 35 and 55% of the focal length of the entire system and the thickness of the compound meniscus in front of the aperture stop lies between 25 and 35% of said overall length and simultaneously the axial thickness of the single meniscus behind the aperture stop is less than 0.6 times and more than 0.25 times that of the compound meniscus in front of the aperture stop.

With such an arrangement there has resulted the advantage that up to a relative aperture of F:2.5 the spherical zone defect amounts to only 0.25% of the focal length of the entire system, and that, due to a very small Petzval sum, over a picture field of 55° a very far reaching flattening of field-curvature is achieved.

An especially good chromatic correction extending over the entire aperture may be attained if the focal length of the convergent part of the compound meniscus lies between 45 and 65% of the focal length of the entire system, and if the cemented surface of the compound meniscus in front of the aperture stop is substantially only chromatically effective, i. e. that the difference between the refractive indices for the $d$-line of the spectrum of the convergent and for that of the divergent part of the cemented meniscus is not greater than 0.01.

The accompanying drawing illustrates diagrammatically an objective according to the invention. In this drawing.

Figure 1:
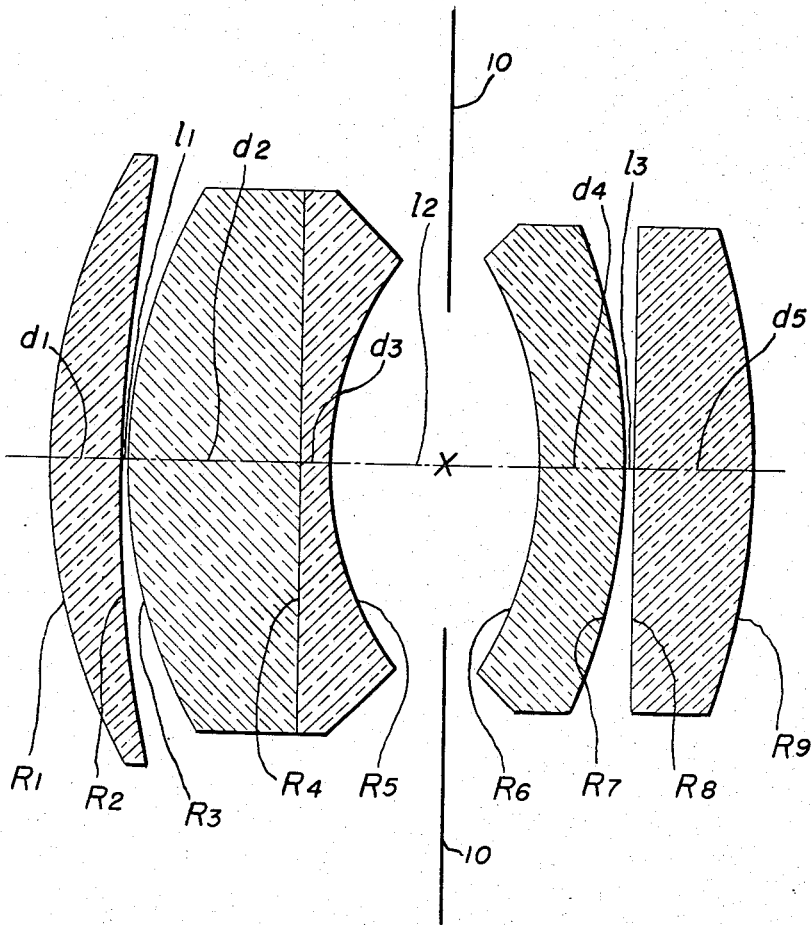
Fig. 1 is a vertical side of the objective.
Figures 2, 3, 4:
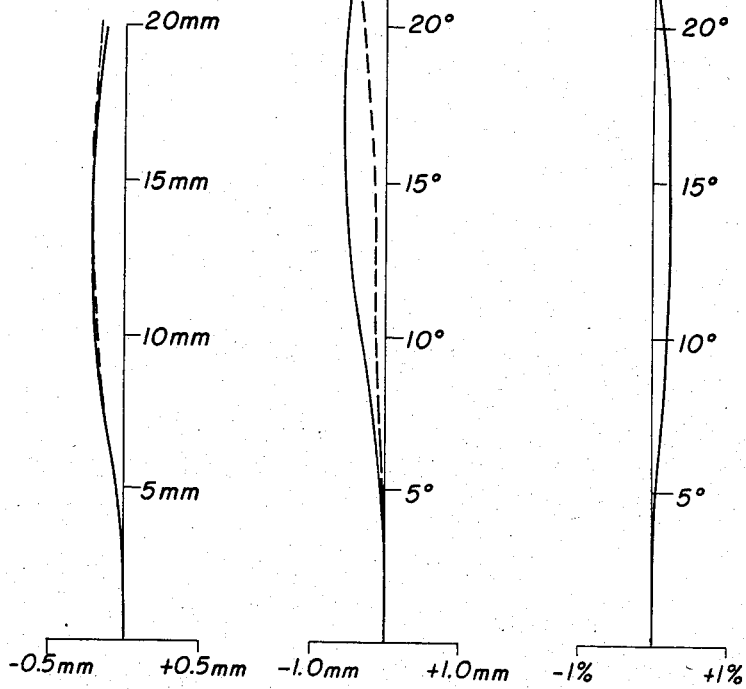
Fig. 2 shows the curve for correction for spherical aberration and sine condition.
Fig. 3 shows the astigmatic curve and Fig. 4 shows the distortion curve.

In Fig. 1 the radii of the lens surfaces are indicated by R, the lens thicknesses by $d$ and the air spaces between the members by $l$. The camera diaphragm is indicated by the reference numeral 10.

The figures given in the following examples for the radii, thicknesses and spacings are applicable for a focal length of the lens combination amounting to f=100 mm.

*Example 1*

[f: 2.8]

| Radii | Thicknesses, Air Spaces | Kinds of Glass | |
|---|---|---|---|
| | | $n_d$ | V |
| $R_1=+41.275$ | $d_1=4.352$ | 1.62320 | 56.7 |
| $R_2=+102.014$ | $l_1=0.297$ | | |
| $R_3=+34.891$ | $d_2=11.475$ | 1.62320 | 56.7 |
| $R_4=+398.006$ | $d_3=1.934$ | 1.62356 | 36.8 |
| $R_5=+21.589$ | $l_2=13.967$ | | |
| $R_6=-25.895$ | $d_4=4.984$ | 1.62356 | 36.8 |
| $R_7=-39.801$ | $l_3=2.790$ | | |
| $R_8=\infty$ | $d_5=5.505$ | 1.62040 | 60.5 |
| $R_9=-43.018$ | | | |

Example 2
[f: 2.5]

| Radii | Thicknesses, Air Spaces | Kinds of Glass | |
|---|---|---|---|
| | | $n_d$ | V |
| $R_1 = +41.132$ | $d_1 = 4.972$ | 1.62425 | 56.8 |
| $R_2 = +101.677$ | $l_1 = 0.304$ | | |
| $R_3 = +34.851$ | $d_2 = 11.392$ | 1.62425 | 56.8 |
| $R_4 = \infty$ | $d_3 = 1.905$ | 1.62356 | 36.8 |
| $R_5 = +21.425$ | $l_2 = 13.870$ | | |
| $R_6 = -25.708$ | $d_4 = 5.963$ | 1.62356 | 36.8 |
| $R_7 = -40.801$ | $l_3 = 0.304$ | | |
| $R_8 = \infty$ | $d_5 = 7.945$ | 1.62309 | 58.1 |
| $R_9 = -42.546$ | | | |

Example 3
[f: 2.5]

| Radii | Thicknesses, Air Spaces | Kinds of Glass | |
|---|---|---|---|
| | | $n_d$ | V |
| $R_1 = +41.693$ | $d_1 = 5.068$ | 1.62345 | 53.1 |
| $R_2 = +96.578$ | $l_1 = 0.120$ | | |
| $R_3 = +33.801$ | $d_2 = 10.783$ | 1.62325 | 57.2 |
| $R_4 = \infty$ | $d_3 = 1.917$ | 1.62356 | 36.7 |
| $R_5 = +21.717$ | $l_2 = 14.222$ | | |
| $R_6 = -26.965$ | $d_4 = 5.931$ | 1.62356 | 36.7 |
| $R_7 = -41.478$ | $l_3 = 2.036$ | | |
| $R_8 = \infty$ | $d_5 = 4.552$ | 1.62029 | 60.5 |
| $R_9 = -44.566$ | | | |

I claim:
1. A photographical objective corrected for spherical and chromatic abberation, astigmatism, coma, field curvature and distortion, having a high relative aperture, and comprising four members separated from each other by air spaces, of which the two outer members are single elements of positive power that include two menisci of negative power having their concave surfaces facing towards the aperture stop, the meniscus in front of the aperture stop being composed of a convergent and a divergent element and the meniscus behind the aperture stop being a single element, wherein the overall length of the system ranges between 35 and 55% of the focal length of the entire system and the thickness of the compound meniscus in front of the aperture stop lies between 25 and 35% of said overall length and simultaneously the axial thickness of the single meniscus behind the aperture stop is less than 0.6 times but more than 0.25 times that of the compound meniscus in front of the aperture stop.

2. A photographic lens as claimed in claim 1, wherein the focal length of the convergent part of the compound meniscus lies between 45 and 65% of the focal length of the entire system, and the difference between the refractive indices for the $d$-line of the spectrum for the convergent and for that of the divergent elements of the compound meniscus is not greater than 0.01.

THEODOR BRENDEL.

References Cited in the file of this patent

UNITED STATES PATENTS

| Number | Name | Date |
|---|---|---|
| 2,171,640 | Berek | Sept. 5, 1939 |
| 2,399,858 | Cox | May 7, 1946 |

FOREIGN PATENTS

| Number | Country | Date |
|---|---|---|
| 665,520 | Germany | Sept. 27, 1938 |
| 575,076 | Great Britain | Feb. 1, 1946 |